US 8,442,355 B2

(12) United States Patent
Imai (10) Patent No.: US 8,442,355 B2
(45) Date of Patent: May 14, 2013

(54) SYSTEM AND METHOD FOR GENERATING A MULTI-DIMENSIONAL IMAGE

(75) Inventor: Francisco H. Imai, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 809 days.

(21) Appl. No.: 12/435,985

(22) Filed: May 5, 2009

(65) Prior Publication Data

US 2009/0290811 A1 Nov. 26, 2009

Related U.S. Application Data (60) Provisional application No. 61/055,921, filed on May 23, 2008.

(51) Int. Cl.
*G06K 9/36* (2006.01)
*G06K 9/32* (2006.01)
*G06T 15/00* (2006.01)
*G06T 17/00* (2006.01)
*H04N 7/00* (2011.01)
*H04N 7/18* (2006.01)

(52) U.S. Cl.
USPC ........... 382/285; 382/276; 382/277; 382/293; 382/299; 382/300; 345/419; 345/422; 348/115

(58) Field of Classification Search ............ 382/285, 382/276, 277, 293, 299, 300; 345/419, 422; 348/115
See application file for complete search history.

(56) References Cited

U.S. PATENT DOCUMENTS

| | | | | |
|---|---|---|---|---|
| 6,438,261 | B1 * | 8/2002 | Moshe et al. | 382/133 |
| 7,265,350 | B2 * | 9/2007 | Fauci et al. | 250/330 |
| 7,298,415 | B2 * | 11/2007 | Nilson et al. | 348/370 |
| 7,385,708 | B2 * | 6/2008 | Ackerman et al. | 356/603 |
| 8,320,996 | B2 | 11/2012 | Panasyuk et al. | |
| 2006/0247514 | A1 * | 11/2006 | Panasyuk et al. | 600/410 |
| 2009/0118600 | A1 * | 5/2009 | Ortiz et al. | 600/306 |

OTHER PUBLICATIONS

Zavattini et al., "A Hyperspectral Fluoroscence Imaging System for Biological Applications", 2003 IEEE Nucleal Science Symposium Conference Record, vol. 2, 2003, pp. 942-946.*
Carr et al., "Surface Interpolation with Radial Basis Functions for Medical Imaging", IEEE Transactions on Medical Imaging, vol. 16 No. 1, Feb. 1997, pp. 96-107.*
International Search Report and Written Opinion dated Aug. 17, 2012 for International Application No. PCT/KR2009/002672 from the Austrian Patent Office, filed May 21, 2009, pp. 1-5, Vienna, Austria.

(Continued)

*Primary Examiner* — Matthew Bella
*Assistant Examiner* — Jose M Torres
(74) *Attorney, Agent, or Firm* — Kenneth L. Sherman, Esq.; Michael Zarrabian, Esq.; Sherman & Zarrabian LLP (57) ABSTRACT

A system and method for generating a multi-dimensional image of an object in a scene is disclosed. One inventive aspect includes a spectral estimation module configured to convert a two-dimensional (2D) high-resolution light intensity image of the scene to a spectral-augmented image of a selected channel. The system further includes a high-resolution depth image generation module configured to generate a high-resolution depth image of the object based on a three-dimensional (3D) low-resolution depth image of the scene and the spectral-augmented image.

14 Claims, 6 Drawing Sheets

OTHER PUBLICATIONS

Zavattini, G. et al., "A Hyperspectral Fluorescence Imaging System for Biological Applications", Proceedings of the 2003 IEEE Nuclear Science Symposium Conference Record, Oct. 2003, pp. 942-946, vol. 2, IEEE, USA.

Carr, J.C. et al., "Surface Interpolation with Radial Basis Functions for Medical Imaging", IEEE Transactions on Medical Imaging, Feb. 1997, pp. 96-107, vol. 16, No. 1, IEEE, USA.

\* cited by examiner

SYSTEM AND METHOD FOR GENERATING A MULTI-DIMENSIONAL IMAGE

CROSS REFERENCE TO RELATED APPLICATIONS

This application claims priority under 35 U.S.C. §119(e) to U.S. provisional patent application 61/055,921 filed on May 23, 2008, which application is hereby incorporated by reference in its entirety.

BACKGROUND OF THE INVENTION

1. Field of the Invention

The invention relates to a system and method for generating a multi-dimensional image, and more particularly, to a system and method for generating a multi-dimensional image using a low-resolution depth image and a high-resolution light intensity image.

2. Description of the Related Technology

In recent years, there has been a strong trend for use of robot-assisted equipment under human supervision for surgery (e.g., neurosurgery). The robot-assisted systems provide tools that are smaller than the surgeon's hands and are often used in procedures that are more precise and consistently repeatable. Many studies show that these automated procedures have reduced recovery time and side effects.

These robot-assisted systems rely heavily on image guidance for surgery planning and execution. In some systems, once an image is captured, it is rendered for visualization in order to plan a surgery. Dedicated systems are used to render three dimensional (3D) medical images. 3D rendering and visualization are very computationally intensive and its processing demands are not compatible with real-time need during surgery. The need to deal with non-rigid organ tissues (such as heart, liver, lungs, pancreas) during surgery makes the volume modeling even more complex. This explains why 3D images are used mainly for surgery planning and not for intra-surgery application.

Virtual reality systems have also been used as a vision-aid for the surgeons to operate surgical robots. However, in such systems, the physician does not see the patient with his own eyes. Instead, the physician sees the patient only through processed electronic signals. The physician relies completely on the precision of the tracking system. Any drifts in the system would have severe, if not lethal, consequences.

Consequently, there is a need for a scheme providing augmented vision in medical applications such as robot-assisted surgery equipments, which properly addresses the above-discussed issues.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

One aspect relates to a method of generating a multi-dimensional image of an object in a scene. The method includes providing a three-dimensional (3D) low-resolution depth image of the scene and a two-dimensional (2D) high-resolution light intensity image of the scene. The method further includes converting the 2D high-resolution light intensity image to a spectral-augmented image of a selected channel. The method further includes segmenting the object from the spectral-augmented image. The method further includes generating a high-resolution depth image of the object based at least in part on the low-resolution depth image and the spectral-augmented image.

Another aspect relates to a system for generating a multi-dimensional image of an object in a scene. The system includes means for providing a three-dimensional (3D) low-resolution depth image of the scene and a two-dimensional (2D) high-resolution light intensity image of the scene. The system further includes means for converting the 2D high-resolution light intensity image to a spectral-augmented image of a selected channel. The system further includes means for generating a high-resolution depth image of the object based at least in part on the 3D low-resolution depth image and the spectral-augmented image.

Another aspect relates to a system for generating a multi-dimensional image of an object in a scene. The system includes a spectral estimation module configured to convert a two-dimensional (2D) high-resolution light intensity image of the scene to a spectral-augmented image of a selected channel. The system further includes a high-resolution depth image generation module configured to generate a high-resolution depth image of the object based on a three-dimensional (3D) low-resolution depth image of the scene and the spectral-augmented image.

DETAILED DESCRIPTION OF CERTAIN INVENTIVE EMBODIMENTS

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Certain embodiments provide a system and method for generating a multi-dimensional image of an object in a scene. In one embodiment, a high-resolution two-dimensional (2D) image is converted into a spectral-augmented image of a selected channel which makes it easier to segment an object in the scene. Thereafter, a high-resolution depth image of the object is generated based on the low-resolution depth image and the spectral-augmented image. Though certain embodiments illustrate the method in an exemplary context of image guidance in surgery, the method is equally applicable to other applications.

Figure 1:
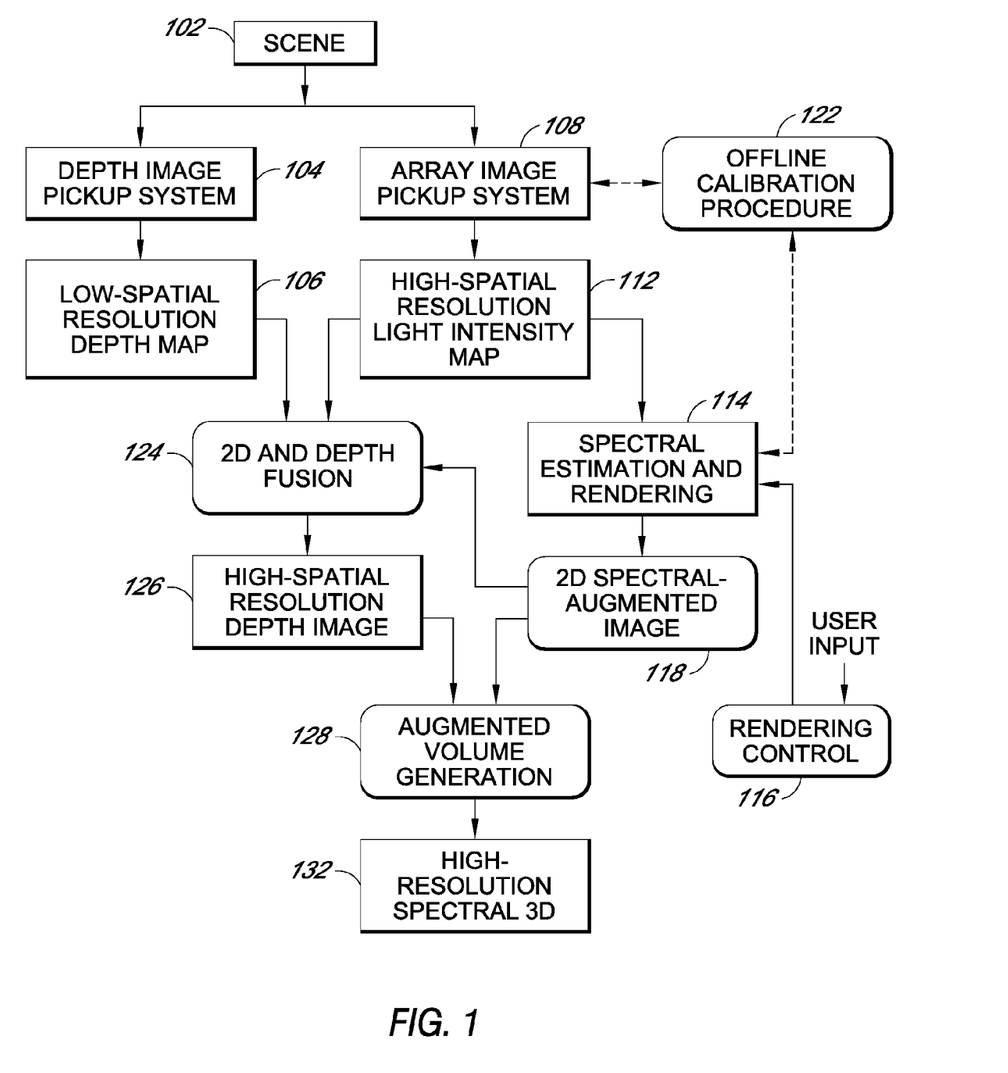
FIG. 1 is a diagram illustrating an exemplary process of generating a multi-dimensional image according to one embodiment.

FIG. 1 is a diagram illustrating an exemplary process of generating a multi-dimensional image according to one embodiment. The embodiment will be described in a context of a surgery for illustration purposes, however, the embodiment is not limited thereto. In the exemplary embodiment, an augmented vision is provided to a physician (or surgeon) who is carrying out a surgery on a patient with a stomach cancer.

Referring to FIG. 1, a scene 102 is captured by a depth image pickup system 104, thus generating a depth image of low spatial resolution 106. The phrase "low resolution" is used to refer to a resolution lower than the resolution of a light intensity image 112 to be described later. The resolution refers to the spatial resolution in the plane of a capturing sensor array in an imaging system such as a camera. The resolution is determined by how much the imaging system, which may include any optics, sensors, and processing units, can resolve spatially, and not simply determined by the number of pixels in the sensor array.

The scene 102 can be any arbitrary scene, either stationary or moving. The scene may include an object which a viewer of the multi-dimensional image is mainly interested in. The object is used to refer to any region of interest in the scene. For example, in a medical application, the scene 102 may be a patient under surgery or examination. The object may be a part of the patient's body subject to surgery or examination, e.g., a part of non-rigid organ tissues including heart, liver, lungs, and pancreas. However, the embodiment is not limited to the medical application. In the exemplary embodiment, the scene is the patient's stomach and the object of interest is the cancerous tissue of the stomach.

The depth image system 104 is an imaging device that encodes depth information instead of light intensity. The depth imaging system 104 may, for example, include a camera that directly encodes information indicating distance to the scene 102 in bits, or a system that can quickly infer the distance information. The depth image system 104 generates an array of depth information typically at a lower spatial resolution than a conventional RGB camera. For example, the depth imaging system 104 may include a depth camera which captures 3D scenes in real-time at a low spatial resolution, e.g., micrometer resolution depending on distance. Depth cameras are suitable for applications in machine vision, autonomous robotics, interactive video gaming, security and surveillance, gesture recognition, automotive, biometrics (e.g., facial recognition), biomechanics analysis, and custom orthopedics. Depth cameras offer much better performance in real time application over traditional 3D scanning techniques that are time consuming or stereoscopic systems that are cumbersome and heavy on computational processing.

One example of the depth camera is the SR3000 model manufactured by Mesa Imaging AG from Zurich, Switzerland (www.mesa-imaging.ch), which captures 3D scenes in real-time at video frame rates at QCIF resolution (176×144 pixels) with direct Cartesian coordinate output (x, y, z coordinates). The SR3000 camera works with an integrated, modulated infrared light source at 850 nm based on the time-of-flight (TOF) principle. The emitted light is reflected by objects in the scene and travels back to the camera, where the precise time of arrival is measured independently by each pixel of the image sensor. This camera is suitable for operation under indoor lighting conditions. The SR3000 camera is offered with a complete visualization software program for Windows, Linux and MacOS computer operating systems. It can be easily connected to a computer via a universal serial bus (USB) enabling straightforward measurement of real-time depth maps.

The scene 102 is also captured by an array imaging system 108, thus generating at least one two-dimensional (2D) digital representation 112 of the scene 102 of a higher resolution than the depth image 106, which thus will be referred to as a high-resolution light intensity image. The phrase "high resolution" is used to refer to a resolution higher than the resolution of the depth image 106. In one embodiment, the 2D light intensity image 112 comprises two, three, or four channels. In one embodiment, the 2D light intensity image comprises electronic bandpass wavelength selection.

The array imaging system 108, which offers a high spatial resolution, may include at least one two-dimensional image acquisition device such as a digital camera. The image acquisition device may include a lens which collects light reflected from a subject (e.g., the scene), one or more filters which filters incident light, a photographing unit which senses the incident light, and an image signal processing unit which converts the sensed light, but this embodiment is not restricted to this configuration. In one embodiment, the digital camera has a total of three or more distinct optical filters. In another embodiment, the digital camera has a total of no more than four distinct optical filters.

In the exemplary embodiment, the array imaging system 108 includes a conventional RGB camera. In certain embodiments, the camera typically has broad-band optical filters. With appropriate offline calibration, the image captured by the RGB camera may be used to estimate a spectral image using an appropriate spectral estimate software A spectral image refers to a set of light intensity images each of which is captured by a filter with its peak bandwidth centered on different wavelength of light. An exemplary spectral estimation system is the FD-1665 3-CCD multispectral camera provided by Fluxdata, Inc. In one embodiment, the broad-band optical filters are selected to have overlap with and to cover the whole spectra of visible light, such that good spectral images may be constructed later from the image captured by the RGB camera. In one embodiment, the RGB camera has a smooth spectral radiance curve under stable continuous illumination.

The high-resolution light intensity image 112 is then processed by a spectral estimation and rendering module 114. The spectral estimation and rendering module 114 converts the high-resolution light intensity image 112 into a 2D spectral-augmented image 118 which includes spectral reflectance information for a selected spectral band (which will be also referred to as a channel) or combination of spectral bands.

In the exemplary embodiment, the band or combination of bands for the 2D spectral-augmented image 118 is selected by a rendering control unit 116 based on user input received from a viewer. The user input includes information indicating or describing the object of interest to him or her in the scene. The rendering control unit 116 then selects a band or combination of bands for the 2D spectral-augmented image 118 depending on the spectral reflectance properties of the object of interest. The band or combination of bands is so selected that the resulting spectral-augmented image 118 emphasizes differences between the object of interest and its surrounding areas thus making it easier for the viewer or the machine to identify and segment the object in the scene. In one embodiment, a list of the typical objects and the corresponding band to be selected are stored in the system. The rendering control unit 116 can readily look up the object in the list and retrieve the corresponding band settings.

In the exemplary context, a physician is performing a surgery on a patient who has stomach cancer. In the surgery, the physician wants to have an augmented view distinguishing the cancerous tissue from the healthy patient tissue. He can select "stomach cancer" in a menu provided by the rendering control unit 116. The rendering control unit 116 then locates stored wavelength settings that help enhance a view of stomach cancer. The rendering control 116 then configures the spectral estimation and rendering module 114 with the selected wavelength settings. The spectral-augmented image 118 as generated makes it easier for the physician to identify and segment the stomach cancer in the scene.

The spectral estimation and rendering module 114 may be any suitable hardware or software that is able to convert the high-resolution light intensity image 112 into a spectral image of a selected spectral band or combination of bands. In one embodiment, the spectral estimation and rendering module 114 generates an estimated spectral image from the high-resolution light intensity image 112 and then filters the spectral image to generate an image of the selected band or channel. In one embodiment, the spectral image is an image of at least three channels.

The spectral reflectance of a scene can be represented in a multidimensional space. Once obtained, the spectral reflectance of the scene may be used to identify how much light is reflected for each wavelength of light. An image taken by a convention RGB camera has only three channels. The estimation from three-dimensional space to multi-dimensional space can be achieved using principal components of spectral reflectance, which may be identified based on statistical distribution of spectral reflectance. Under this approach, the spectral reflectance can be expressed as a linear combination of the principal component vectors. It has been shown that spectral reflectance of Japanese women's skin may be estimated with 99.5% accuracy using just three principal components of the spectral reflectance of the skin by Francisco Imai, "Color Reproduction of Facial Pattern and Endoscopic Image Based on Color Appearance Models", PhD Thesis of Chiba University, December 1996. The findings of this research can generalized to skin color of a wider population.

A method for scene image acquisition and spectral estimate using a wide-band multi-channel image capture is described in U.S. patent application Ser. No. 09/692,923, filed Oct. 20, 2000, and titled "system and method for scene image acquisition and spectral estimate using a wide-band multi-channel image capture," which is incorporated by reference hereby in its entirety. A method to estimate a spectral image from a three-channel light intensity image has been described by Francisco Imai and R. S. Berns, Spectral estimation using trichromatic digital cameras, *Proc. of the International Symposium on Multispectral Imaging and Color Reproduction for Digital Archives*, Chiba University, Chiba, Japan, 1999, pp. 42-49, which is incorporated by reference hereby in its entirety.

The low-resolution depth image 106 is then combined with the high-resolution 2D light intensity image 112 by a high-resolution depth image generation module 124, resulting in a high-resolution depth image 126. In this process, the spectral-augmented image 118 is used to select the object of interest. Further detail on this process will be described hereinafter with regard to FIG. 2.

Optionally, the high-resolution depth image 126 may be combined with the spectral-augmented image 118 by an augmented volume generation module 128 resulting in a high-resolution spectral 3D representation 132. As a result, the images captured by the array imaging system 108 and the depth imaging system 104 are extended to video frames producing five-dimensional data (3D of the volume plus time domain and spectral domain). In one embodiment, augmented volume data may be rendered based on the depth information thereby creating an illusion of depth in a conventional 2D display based on parallax.

In one embodiment, the augmented volume generation module 128 renders the appropriate perspective of 3D content by using the high-resolution depth image 126 and tracking movement of the viewer or observer's head. In addition, it is also possible to add brightness information (e.g., black/white spectral information or RGB color information) from the spectral-augmented image 118 on top of extracted 3D information by providing the viewer with simultaneous 3D rendering of a particular spectral band of the object of interest. This results in the high-resolution spectral 3D image(s) 132.

The array imaging system 108 and the spectral estimation and rendering module 114 may be configured by an offline calibration module 122. The calibration is performed such that good spectral images may be estimated from the high-resolution light intensity image 112 as captured by the array imaging system 108. In one embodiment, the calibration may include capturing an image of one or more subjects with known spectral reflectance factors (e.g., conventional color checkers) and then building a transformation from the image captured to the spectral reflectance as characterized by the known spectral reflectance factors. In the exemplary context, since the object of interest is cancerous tissue of the patient's stomach, the calibration may be performed using subjects such as human skin with known spectral reflectance factors.

In the exemplary embodiment, the array imaging system 108 includes a conventional RGB camera. In another embodiment, the array imaging system 108 may be a designed imaging system including a black and white (BW) camera, which does not have a color filter array, and optimal optical filters designed for spectral imaging capture. Such a designed imaging system could have either narrow-band optical filters or broad-band optical filters. In one embodiment, the BW camera takes pictures of the same scene successively with illumination having different spectral radiance properties from each other.

The designed imaging system also requires calibration as performed by the off-line calibration procedure 122. Also, the spectral estimation and rendering module 114 may also need to adjust its procedure to properly generate the 2D spectral-augmented image 118 from the high-resolution light intensity image 112 as captured by the designed imaging system. A set of filters for a five channel multi-spectral camera having high quality spectral performance are described by F. H. Imai, S. Quan, M. R. Rosen and R. S. Berns, Digital Camera Filter Design for Colorimetric and Spectral Accuracy, *Proc. of*

*Third International Conference on Multispectral Color Science*, Finland, 2001, pp. 13-16, which is incorporated by reference hereby in its entirety.

Figure 2:
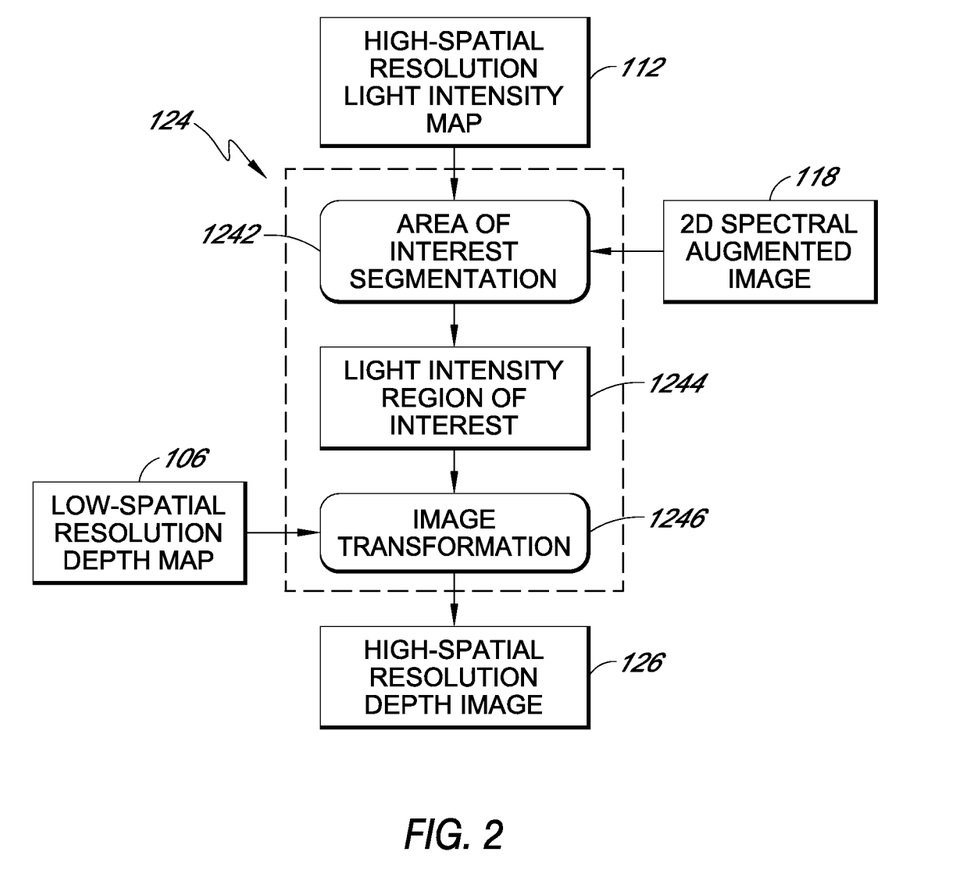
FIG. 2 is a diagram illustrating the process of generating a high-resolution image of FIG. 1.

FIG. 2 is a diagram illustrating the process of generating a high-resolution image of FIG. 1. The high-resolution depth image generation module 124 generates a high-resolution depth image 126 based on the high-resolution light intensity image 112, the spectral augmented image 118, and the low-resolution depth image 106.

Referring to FIG. 2, the high-resolution depth image generation module 124 includes an area of interest segmentation module 1242 which uses the spectral-augmented image 118 to determine an object or region of interest in the high-resolution light intensity image 112, resulting in a segmented light intensity object of interest 1244. In certain embodiments, the object of interest may be identified and/or segmented automatically by the machine. The object of interest may also be identified and/or segmented by rendering the spectral-augmented image 118 for display to a human user who segments the object of interest based on his vision. The segmented light intensity object of interest 1244 is a portion which is extracted from the high-resolution light intensity image 112 and corresponds to the object of interest as identified.

An image transformation module 1246 then correlates the segmented light intensity object of interest 1244 with the low-resolution depth image 106. In one embodiment, this may be done by first generating a high-resolution depth image from the low-resolution depth image 106 and then using the segmented light intensity object of interest as a marker to extract the portion of the high-resolution depth image corresponding to the segmented object of interest. The high-resolution depth image may be generated from the low-resolution depth image by interpolating. It may also be generated by copying pixel value from the low-resolution depth image into corresponding pixels in the high-resolution depth image.

As described above with regard to FIGS. 1 and 2, the exemplary embodiment allows the surgeon to see in real-time volume data of the object of interest of a patient's tissue (e.g., a cancerous area in the patient's stomach) on a conventional 2D display. The objective of interest is segmented from a spectral image of the appropriate spectral bands. It will be appreciated that this embodiment may be used in any applications for enhancing a human user's vision.

Figure 3:
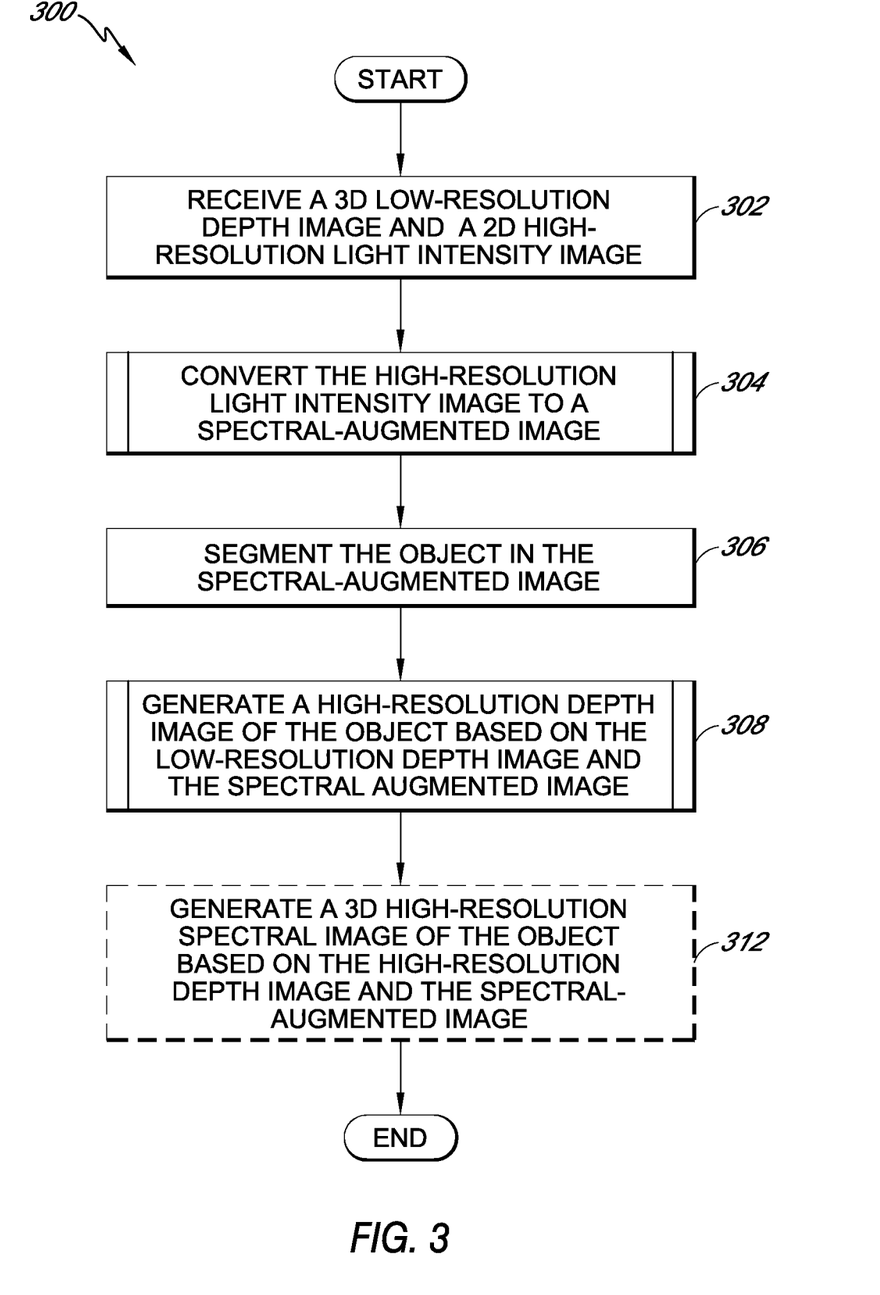
FIG. 3 is a flowchart illustrating a method of generating a multi-dimensional image according to one embodiment.

FIG. 3 is a flowchart illustrating a method of generating a multi-dimensional image according to one embodiment. Depending on the embodiment, certain blocks of the method may be removed, merged together, or rearranged in order.

The method 300 starts at a block 302, where a 3D low-resolution depth image and a 2D high-resolution light intensity image are provided. The 3D low-resolution depth image and the 2D high-resolution light intensity image are captured of the same scene. The method 300 may optionally include the process of capturing the 3D low-resolution depth image. The method 300 may optionally include the process the capturing the 2D high-resolution light intensity image.

Moving to a block 304, the high-resolution light intensity image is converted to a spectral-augmented image which includes spectral reflectance information for a selected spectral band or combination of bands. The image conversion will be described later in further detail with regard to FIG. 4.

Next at a block 306, an object of interest is identified in the spectral-augmented image. In the exemplary embodiment, block 306 may further include extracting a portion of the high-resolution light intensity image corresponding to the object of interest.

Moving to a block 308, a high-resolution depth image of the object is generated based on the low-resolution depth image. The block 308 will be described later in further detail with regard to FIG. 5.

Next at an optional block 312, a 3D high-resolution spectral image of the object is generated based on the high-resolution depth image and the spectral-augmented image. In one embodiment, the 3D high-resolution spectral image of the objected is generated by combining the high-resolution depth image and the spectral-augmented image. As a result, the images captured by the array imaging system and the depth imaging system are extended to video frames producing five-dimensional data (3D of the volume plus time domain and spectral domain). In one embodiment, augmented volume data may be rendered based on the depth information thereby creating an illusion of depth in a conventional 2D display based on parallax.

Figure 4:
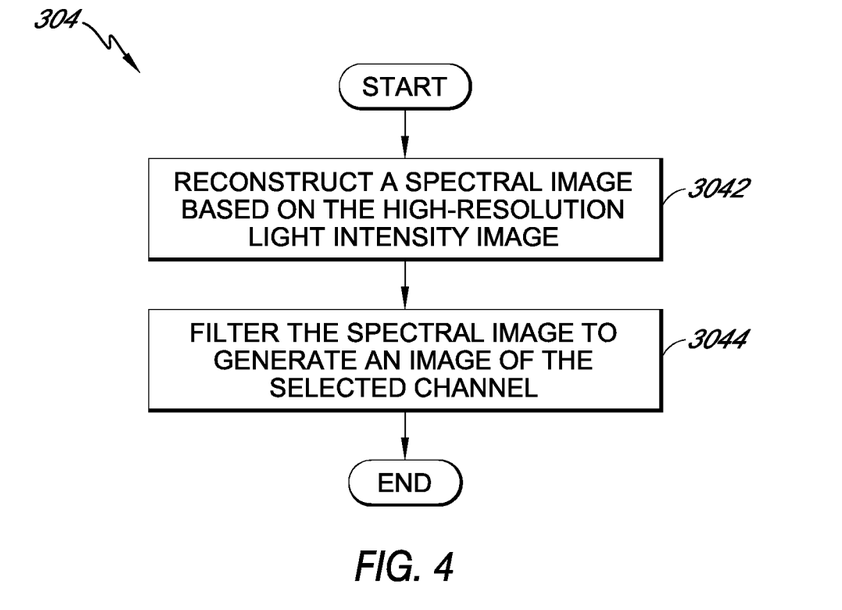
FIG. 4 is a flowchart illustrating a method of converting a high-resolution light intensity image to a spectral-augmented image according to one embodiment.

FIG. 4 is a flowchart illustrating a method of converting a high-resolution light intensity image to a spectral-augmented image according to one embodiment. Depending on the embodiment, certain blocks of the method may be removed, merged together, or rearranged in order. The method 304 starts at a block 3042, wherein a spectral image is estimated based on the high-resolution light intensity image. In one embodiment, the spectral image is estimated from the high-resolution light intensity images performed by using principal components of spectral reflectance, which may be identified based on statistical distribution of spectral reflectance. Under this approach, the spectral reflectance can be expressed as a linear combination of the principal component vectors. In the exemplary embodiment, a conventional camera system with broadband filters is used. A calibration procedure is then used to build transformations from light intensity images captured by the camera system to scalars of the principal component vectors. In the calibration procedure, the camera system captures test images of targets with known spectral reflectance. The desirable transformation is calculated by inverting the transformation from test light intensity images to the known spectral reflectance.

Moving to a block 3044, the spectral image is filtered to estimate the light intensity image of the selected channel. The channel may be variably selected to make differences between the object of interest and its surrounding region more noticeable in the spectral-augmented image than in the 2D light intensity image. Also, the channel may be selected based on a user input depending at least on spectral reflectance properties of the object of interest.

Figure 5:
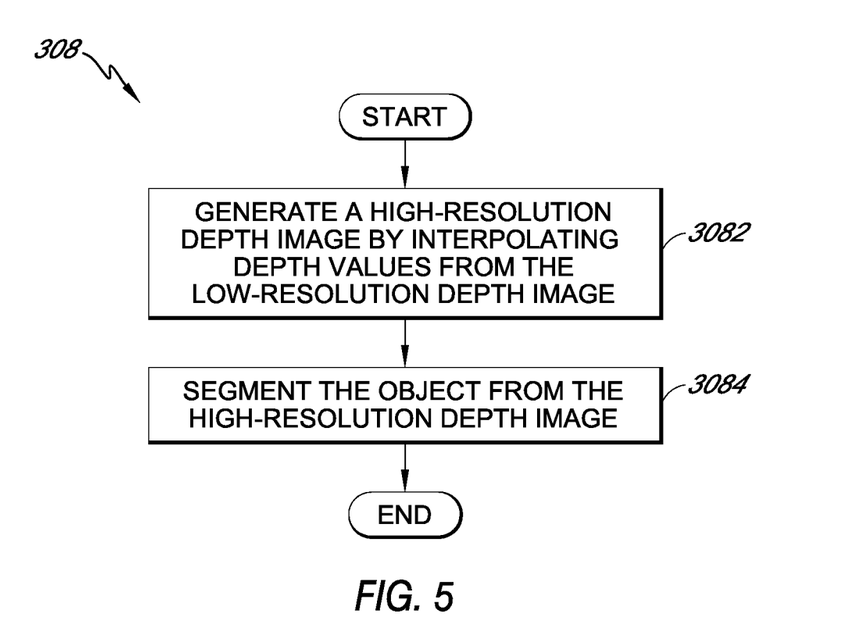
FIG. 5 is a flowchart illustrating a method of generating a high-resolution depth image based on the low-resolution depth image according to one embodiment.

FIG. 5 is a flowchart illustrating a method of generating a high-resolution depth image based on the low-resolution depth image according to one embodiment. Depending on the embodiment, certain blocks of the method may be removed, merged together, or rearranged in order.

The method 308 starts at a block 3082, wherein a high-resolution depth image is generated from the low-resolution depth image by interpolating. In another embodiment, the high-resolution depth image may be generated by copying pixel values from the low-resolution depth image into corresponding pixels in the high-resolution depth image.

Moving to a block 3084, where a part corresponding to the object of interest is extracted from the high-resolution depth image. This may be done by using the extracted portion of the high-resolution light intensity image corresponding to the object of interest as a marker to filter the high-resolution depth image.

Figure 6:
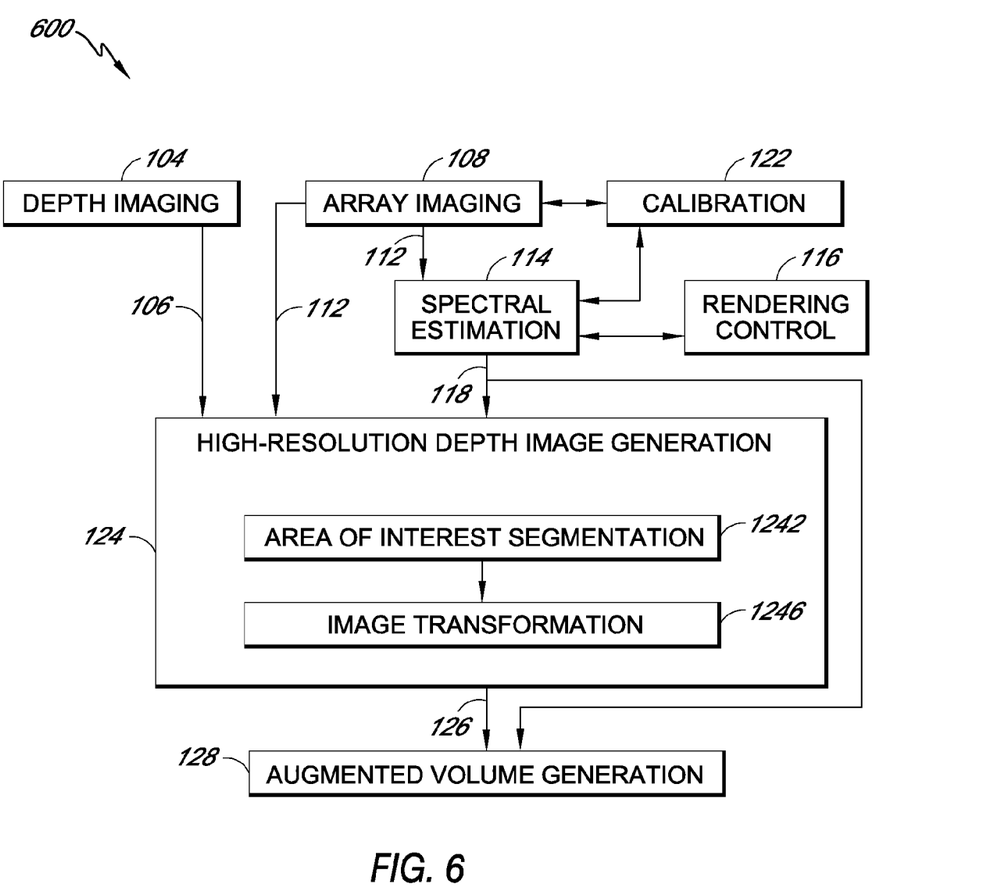
FIG. 6 is a block diagram of an apparatus for generating a multi-dimensional image according to one embodiment.

FIG. 6 is a block diagram of an apparatus for generating a multi-dimensional image according to one embodiment.

Depending on the embodiment, certain blocks of the method may be removed or merged together.

The term "module", as used herein, means, but is not limited to, a software or hardware component, or any combination thereof, which performs certain tasks. A module may be a processor which may be any suitable general purpose single- or multi-chip microprocessor, or any suitable special purpose microprocessor such as a digital signal processor, microcontroller, or a programmable gate array. As is conventional, the processor may be configured to execute one or more software applications.

A module may be configured to reside on an addressable storage medium and configured to execute on one or more processors. The storage medium may be any computer-readable medium or any device suitable for data storage, e.g., a memory capable of storing firmware. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Referring to FIG. 6, the system 600 may include the depth imaging system 104 which captures a low-resolution depth image 106 of a scene. The depth imaging system 104 is an imaging device that encodes depth information instead of light intensity. The depth imaging system 104 may, for example, include a camera that directly encodes information indicating distance to the scene 102 in bits, or a system that can quickly infer the distance information. The depth image system 104 generates an array of depth information typically at a lower spatial resolution than a convention RGB camera. For example, the depth imaging system 104 may include a depth camera which captures 3D scenes in real-time at a low spatial resolution, e.g., micrometer resolution depending on distance.

The system 600 may further include the array imaging system 108 which captures a high-resolution light intensity image 112 of the same scene. The array imaging system 108, which offers a high spatial resolution, may include at least one two-dimensional image acquisition device such as a digital camera. The image acquisition device may include a lens which collects light reflected from a subject (e.g., the scene), one or more filters which filters incident light, a photographing unit which senses the incident light, and an image signal processing unit which converts the sensed light, but this embodiment is not restricted to such a configuration. In one embodiment, the digital camera has a total of three or more distinct optical filters. In another embodiment, the digital camera has a total of no more than four optical filters.

The spectral estimation module 114 converts the high-resolution light intensity image 112 from the array imaging system 108 to a spectral-augmented image 118 which includes spectral reflectance information for a selected spectral band or combination of bands based on instruction from the rendering control module 116. In one embodiment, the spectral estimation and rendering module 114 generates an estimated spectral image from the high-resolution light intensity image 112 and then filters the spectral image to generate an image of the selected band or channel. In one embodiment, the spectral image is an image of at least three channels.

The rendering control module 116 determines the selected band for the 2D spectral-augmented image based on user input received from a viewer. The user input includes information indicating or describing the object of interest in the scene. The rendering control module 116 then selects a band or combination of bands for the 2D spectral-augmented image 118 depending on the spectral reflectance properties of the object of interest. The band or combination of bands is so selected that the resulting spectral-augmented image 118 emphasizes differences between the object of interest and its surrounding areas thus making it easier for the viewer or the machine to identify the object in the scene. In one embodiment, a list of the typical objects and the corresponding band to be selected are stored in the system 600. The rendering control module 116 can readily look up the object in the list and retrieve the corresponding band settings.

The high-resolution depth image generation module 124 combines a low-resolution depth image 106 and the high-resolution 2D light intensity image 112 based on the spectral-augmented image 118. The high-resolution depth image generation module 124 includes an area of interest segmentation module 1242 which uses the spectral-augmented image 118 to determine the object or region of interest in the high-resolution light intensity image 112.

The high-resolution depth image generation module 124 further includes an image transformation module 1246 which generates a high-resolution depth image of the object as identified. In one embodiment, this may be done by first generating a high-resolution depth image from the low-resolution depth image and then extracting the portion of the high-resolution depth image corresponding to the segmented object of interest. The high-resolution depth image may be generated from the low-resolution depth image by interpolating. It may also be generated by copying pixel values from the low-resolution depth image into corresponding pixels in the high-resolution depth image.

Optionally, the system 600 may further include the augmented volume generation module 128, which combines the high-resolution depth image 126 with the spectral-augmented image 118 and generating a high-resolution spectral 3D representation. As a result, the images captured by the array imaging system 108 and the depth imaging system 104 are extended to video frames producing five-dimensional data (3D of the volume plus time domain and spectral domain). Augmented volume data may be rendered based on the depth information thereby creating an illusion of depth in a conventional 2D display based on parallax. In one embodiment, each of the 3D low-resolution depth image and the 2D high-resolution light intensity image includes a plurality of images in a video and the method is performed in real time to track the object in the scene across the images.

The foregoing embodiments provide various benefits among others over the existing solutions. One limitation of current 3D images is its reliance on a conventional RGB color space. The RGB color space is device-dependent in that it is intrinsic to the display device, i.e., RGB images displayed in two different devices would not necessarily look the same, which limits image portability. The spectral images provide increased spectral discrimination by using narrower imaging band and decreasing the spectral sampling, thus resulting in multiple channels (e.g., typically six to thirty channels). The use of spectral imaging allows increased fidelity in spectral reflectance. However, it is impractical to use multiple channels capturing in real-time applications such as a surgery due to the non-static nature of the targets. A traditional spectral imaging further exacerbates the intractable volume of the captured image data.

The foregoing embodiments offers enhanced physical-based volumetric scene representation. Spectral imaging systems can capture relatively high-spatial, high-spectral resolution of the scene but only in 2D, while depth cameras can capture depth information with accuracy (within certain distance range) but only with low spatial resolution. By combining both imaging modalities, it is possible to capture high-resolution volumetric and spectral properties of a scene.

The foregoing embodiments also provide improved object tracking. Computer vision system for volumetric object tracking using conventional 2D cameras is, in general, very computationally intensive, thus limiting its practical use. The spectral-augmented image offers a higher spectral resolution than human visual perception and most conventional cameras (based on the primary colors RGB), thus making it easier to discriminate subtle differences in color properties between the object of interest and its surrounding areas. This allows focusing the 3D tracking on the region of interest as identified. In addition, the depth image, which clips information within certain distance ranges, also speeds up the object tracking, because it allows elimination of background noise and determining occlusion effects. In one embodiment, each of the 3D low-resolution depth image and the 2D high-resolution light intensity image includes a plurality of images in a video and the method is performed in real time to track the object in the scene across the images.

The foregoing embodiments also provide improved augmented human vision. In certain embodiments, it is possible to select wavelengths that can emphasize certain properties of a region of interest thus making the differences between the region of interest and its surrounding areas more noticeable. An augmented image is then generated and superimposed on a visual representation of the scene.

In addition, a viewer-rendering processing can be used to create a more immersive viewing experience than virtual reality systems. In virtual reality systems, the physician relies completely on the precision of the tracking system. Any drifts in the system would have severe, if not lethal, consequences. In the foregoing embodiments, a better approach, i.e., a mixed reality approach is used which allows the surgeon to see the patient using a see-through display that is also capable of overlaying augmented information on top of the actual scene.

Figure 7:
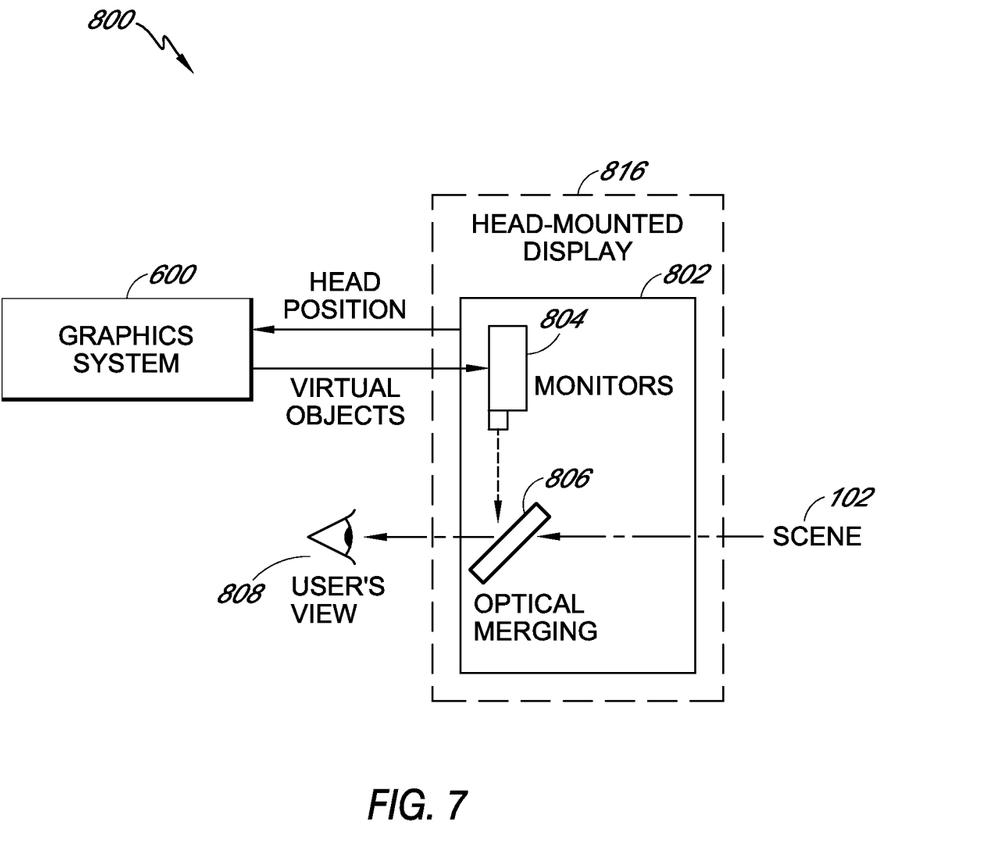
FIG. 7 is a block diagram illustrating an exemplary augmented vision system suitable for being used in medical applications.

FIG. 7 is a block diagram illustrating an exemplary augmented vision system suitable for being used in medical applications. Though the system will be described using a vision-augmented surgery as a context for illustration, the system is not limited to surgery or medical application. The embodiment can be equally applied to any suitable applications for vision augmentation.

The augmented vision system 800 includes a graphics system 600 as described above with regard to FIG. 6. The graphics system 600 is able to render 3D content based on images captured by its own depth imaging system and array imaging system of a scene 102. In the exemplary embodiment, the scene 102 may be a patient undergoing a surgery process.

The augmented vision system 800 also includes a vision augmentation module 816. In the exemplary embodiment, the vision augmentation module 816 has a head-mounted display 802. The display is mounted on the head of a surgeon and tracks the movement of his head. The head-mounted display 802 then transmits information on the surgeon's head position to the graphics system 600, which then renders the appropriate perspective of 3D content using the head position information. Such 3D content is sent back to the head-mounted display 802 for rendering on a 2D monitor 804.

The head-mounted display 802 also includes an optical lens 806 which is transparent on one surface and reflective on the other. The user has a direct vision 808 of the scene 102 through the lens 806. Also, the lens 806 reflects the image rendered on the monitor 804 into the surgeon's view 808, thus superimposing the 3D content generated by the graphics system 600 on the surgeon's direct vision of the scene, thus augmenting his vision.

As shown above, the exemplary embodiment augments a surgeon's vision while allowing him or her to have direct vision of the patient.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of generating a multi-dimensional image of an object in a scene, the method comprising:
   capturing a three-dimensional (3D) low-resolution depth image of the scene into a low-spatial resolution depth map in a memory and a two-dimensional (2D) high-resolution light intensity image of the scene into the memory;
   converting the 2D high-resolution light intensity image from the memory to a spectral-augmented high-resolution image of a selected channel, wherein the channel is a selected spectral band, wherein the converting includes receiving a selection of an object of interest and selecting a channel based upon stored parameters for the object of interest, wherein the converting includes adding spectral reflectance information for the selected channel;
   segmenting the object from the spectral-augmented high-resolution image, resulting in a segmented version of the spectral-augmented high-resolution image; and
   generating a high-resolution depth image of the object based at least in part on the 3D low-resolution depth image and the segmented version of the spectral-augmented high-resolution image.

2. The method of claim 1, further comprising generating a 3D high-resolution spectral image of the object based on the high-resolution depth image and the spectral-augmented high-resolution image, the 3D spectral image comprising volume and spectral information.

3. The method of claim 2, further comprising augmenting a user's direct vision of the scene by superimposing the 3D high-resolution spectral image on the direct vision.

4. The method of claim 1, wherein the object is a human body part under a medical operation or examination by a physician, and wherein the high-resolution depth image is used to provide an augmented vision for the physician.

5. The method of claim 1, wherein the object comprises non-rigid human or animal organ tissues.

6. The method of claim 1, wherein the 2D light intensity image comprises two, three, or four channels.

7. The method of claim 1, wherein the 2D light intensity image comprises electronic bandpass wavelength selection.

8. The method of claim 1, wherein the channel of the spectral-augmented high-resolution image is variably selected to make differences between the object and its surrounding region more noticeable in the spectral-augmented high-resolution image than in the 2D light intensity image.

9. The method of claim 1, wherein the channel is selected based on a user input depending at least on spectral reflectance properties of the object.

10. The method of claim 1, wherein converting the 2D high-resolution light intensity image to a spectral-augmented high-resolution image of a selected channel comprises:
   reconstructing a spectral image having at least three channels from the 2D high-resolution light intensity image; and
   filtering the spectral image to generate an image of the selected channel.

11. The method of claim 1, wherein generating a high-resolution depth image of the object comprises:
   generating a high-resolution depth image of the scene by interpolating depth values from the low-resolution depth image; and
   segmenting the object from the high-resolution depth image.

12. The method of claim 1, wherein each of the 3D low-resolution depth image and the 2D high-resolution light intensity image comprises a plurality of images in a video, and the method is performed in real time to track the object in the scene across the images.

13. A system for generating a multi-dimensional image of an object in a scene, the system comprising:
   means for capturing a three-dimensional (3D) low-resolution depth image of the scene into a low-spatial resolution depth map in a memory and a two-dimensional (2D) high-resolution light intensity image of the scene into the memory;
   means for converting the 2D high-resolution light intensity image from the memory to a spectral-augmented high-resolution image of a selected channel, wherein the channel is a selected spectral band, wherein the converting includes receiving a selection of an object of interest and selecting a channel based upon stored parameters for the object of interest, wherein the converting includes adding spectral reflectance information for the selected channel; and
   means for generating a high-resolution depth image of the object based at least in part on the 3D low-resolution depth image and the segmented version of the spectral-augmented high-resolution image.

14. The system of claim 13, further comprising means for segmenting the object from the spectral-augmented high-resolution image into a segmented version of the spectral-augmented high-resolution image.

* * * * *